UNITED STATES PATENT OFFICE.

BENJAMIN GOLDENBERG, OF NEW YORK, N. Y.

METHOD FOR MAKING DOLLS' HEADS AND LIMBS.

1,010,042.  Specification of Letters Patent.  Patented Nov. 28, 1911.

No Drawing.  Application filed August 10, 1910. Serial No. 576,583.

*To all whom it may concern:*

Be it known that I, BENJAMIN GOLDENBERG, a citizen of the United States, residing in the city of New York, county and State of New York, have invented certain new and useful Improvements in Methods for Making Dolls' Heads and Limbs, of which the following is a specification.

My present invention relates to an improved method of making heads and limbs of dolls and more especially to preventing the coloring of the cheeks and eyes and other decoration from running or rubbing off when wet.

Heretofore in the manufacture of dolls it has been customary to employ a material for the heads and limbs including as ingredients materials such as glue with or without glycerin and having a filler such as zinc oxid with or without the addition of some kind of wax. The parts were then suitably decorated by painting in the cheeks, eyes, etc. Finally they were dipped in collodion and after drying were ready for the market. The great difficulty with this method was that the decoration when moistened, rubbed off, even the moisture of the fingers being sufficient, so that the doll in the hands of the child soon lost its decoration. This defect of the old process has been recognized for years, efforts have been continually made to remedy it but without success, until I discovered my present process. In the light of this discovery it seems that the difficulty with the old process was that the oil paints constituting the decoration themselves insoluble, were applied directly upon a water-soluble composition, viz: the aforesaid glue-filler material. The result was that the thereafter applied coating of collodion was insufficient to prevent the paint from rubbing off from said soluble and therefore imperfect and impermanent base. At any rate, my present process discovered as stated only after years of search, obviates the defect of the old process and in its preferred form is as follows: The doll parts made of some such material as the aforesaid glue composition suitably tinted to the desired flesh tint are first dipped into a solution of gun cotton in amyl acetate. This being permitted to dry, the cheeks and other parts are then suitably decorated with oil paints. Finally the parts are dipped into a wood alcohol solution of shellac and after drying are ready for the market. When the doll parts are made up in accordance with this process, it is found that their decorations are not substantially affected by wetting and rubbing.

In my process it will be seen that the oil paints are not applied directly to the soluble base, but to that base rendered insoluble or at least protected from the direct action of moisture by a coating insoluble in water. Further it will be noted that the oil paints are protected against rubbing off under direct abrasion by a superimposed coating, preferably shellac. Furthermore the shellac being insoluble in water, reinforces the first-named insoluble coating.

As an additional advantage of the present process the tendency to a glassy appearance of the parts made under the old process is avoided, this having been due to the fact that the collodion was the outermost layer in the finished parts. In the parts made under my present process, the shellac layer is outermost and gives a non-glassy flesh-like texture thereto, especially if the percentage of the shellac in the wood alcohol solution be kept low.

Having thus described my invention, what I claim is:

1. The method of making dolls' heads and limbs consisting in molding said parts out of a composition comprising glue and a filler, coating said parts with an amyl acetate solution of gun cotton, thereafter decorating the parts with oil paints and finally coating the decorated parts with a wood alcohol solution of shellac.

2. The method of making dolls' heads and limbs consisting in molding said parts out of a composition comprising glue and a filler, coating said parts with a solution of gun-cotton, thereafter decorating the parts with oil paints and finally coating the decorated parts with a solution of shellac.

3. The method of making dolls' heads and limbs consisting in molding said parts out of a composition comprising glue and a filler, coating said parts with a film of material insoluble in water, and thereafter decorating the parts with oil paints.

4. The method of making dolls' heads and limbs consisting in molding said parts out of a composition comprising glue and a filler; coating said parts with a film of material insoluble in water; thereafter decorating the parts with oil paints and finally coating the decorated parts with another film which is insoluble in water and is transparent.

In testimony whereof, I have affixed my signature in the presence of two witnesses.

BENJAMIN GOLDENBERG. [L. S.]

Witnesses:
    JACOB LASESER,
    AGNES BRADLEY.